US011004220B2

(12) United States Patent
Le Troter et al.

(10) Patent No.: US 11,004,220 B2
(45) Date of Patent: May 11, 2021

(54) METHOD AND DEVICE FOR SEGMENTING IMAGES BY AUTOMATIC PROPAGATION INTO AN (N+1)-TH DIMENSION OF AN IMAGE SEGMENTATION INITIALIZED IN DIMENSION N

(71) Applicants: Universite d'Aix Marseille, Marseilles (FR); Centre National de la Recherche Scientifique, Paris (FR)

(72) Inventors: Arnaud Le Troter, Aix en Provence (FR); David Ben Dahan, Marseilles (FR); Augustin Ogier, Saint-Jouan-des-Guerets (FR)

(73) Assignees: Universite d'Aix Marseille, Marseilles (FR); Centre National de la Recherche Scientifique, Paris (FR)

( * ) Notice: Subject to any disclaimer, the term of this patent is extended or adjusted under 35 U.S.C. 154(b) by 0 days.

(21) Appl. No.: 16/626,762

(22) PCT Filed: Jul. 10, 2018

(86) PCT No.: PCT/FR2018/051732
§ 371 (c)(1),
(2) Date: Dec. 26, 2019

(87) PCT Pub. No.: WO2019/012220
PCT Pub. Date: Jan. 17, 2019

(65) Prior Publication Data
US 2020/0134846 A1 Apr. 30, 2020

(30) Foreign Application Priority Data
Jul. 10, 2017 (FR) ...................................... 1756499

(51) Int. Cl.
*G06T 7/38* (2017.01)
*G06T 7/11* (2017.01)

(52) U.S. Cl.
CPC .................. *G06T 7/38* (2017.01); *G06T 7/11* (2017.01); *G06T 2207/10016* (2013.01); *G06T 2207/10088* (2013.01); *G06T 2207/30004* (2013.01)

(58) Field of Classification Search
CPC ..... G06T 7/11; G06T 7/30; G06T 7/38; G06T 7/0012; G06T 2207/10016;
(Continued)

(56) References Cited

U.S. PATENT DOCUMENTS 8,977,029 B2 * 3/2015 Du ............................ G06T 7/11
382/131
10,504,252 B2 * 12/2019 Razeto .................. G06T 3/0068
(Continued)

OTHER PUBLICATIONS

Ogier et al., "Individual muscle segmentation in MR images: A 3D propagation through 2D non-linear registration approaches", 2017 39th Annual International Conference on the IEEE Engineering in Medicine and Biology Society (EMBC), Jul. 11-15, 2017, pp. 317-320 (Year: 2017).*
(Continued)

*Primary Examiner* — Ping Y Hsieh
*Assistant Examiner* — Jose M Torres
(74) *Attorney, Agent, or Firm* — Oblon, McClelland, Maier & Neustadt, L.L.P.

(57) ABSTRACT

This method (100) for automatic propagation into an (N+1)-th dimension of an image segmentation initialized in dimension N, N≥2, comprises the acquisition (102) of an ordered series of image representations of dimension N and an initial segmentation (104) in dimension N of a region of interest in the first and last image representations of the series, to obtain first and last initial segmentation masks ($M_0$, $M_n$) of the region of interest.
It further comprises an estimation (106) of registration parameters ($L_a$, $L_d$) between the first and last initial seg-
(Continued)

Figure 1:
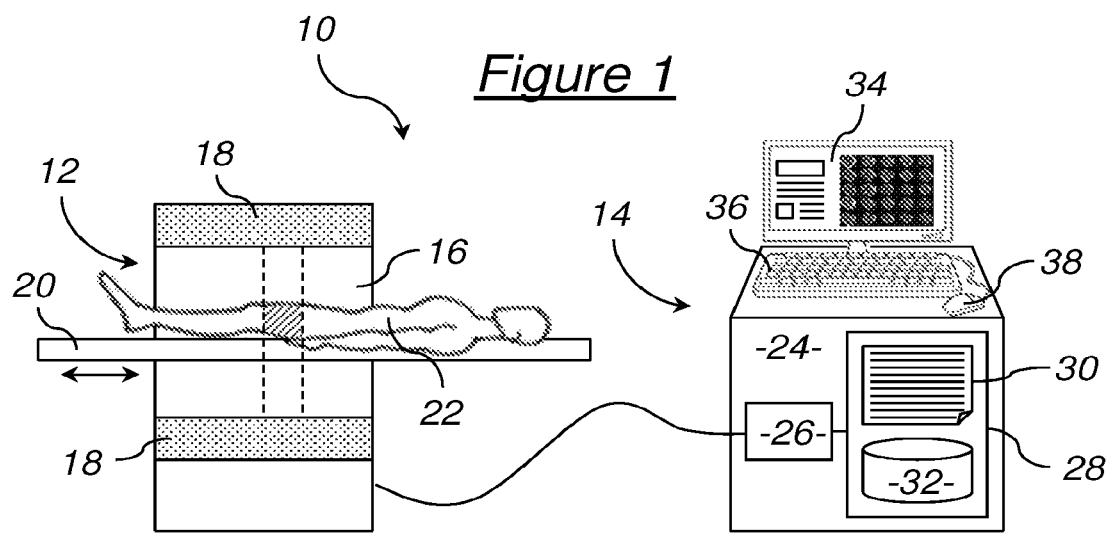

mentation masks, and upward and downward automatic propagations (108) of the initial segmentation, from the first and last image representations, to all the other image representations of the series by step-by-step registration up to the last and first image representations. The upward and downward automatic propagations are then combined with one another (110, 112) using a reference frame change, between the first and last image representations, obtained by applying the estimated registration parameters ($L_a$, $L_d$).

10 Claims, 3 Drawing Sheets

(58) Field of Classification Search
CPC . G06T 2207/10088; G06T 2207/20104; G06T 2207/30004
See application file for complete search history.

(56) References Cited

U.S. PATENT DOCUMENTS

| | | | |
|---|---|---|---|
| 2006/0002630 A1* | 1/2006 | Fu | G06T 7/344 382/294 |
| 2015/0023575 A1* | 1/2015 | Valadez | G06T 7/11 382/131 |

OTHER PUBLICATIONS

International Search Report dated Oct. 22, 2018 in PCT/FR2018/051732 filed on Jul. 10, 2018, 2 pages.
Ogier, A. et al., "Segmentation des muscles individuels en IRM basee sur des approches de recalage non-lineaire," Mar. 13, 2017, 1 total page, XP055418585.
Avants, B. B. et al., "Symmetric diffeomorphic image registration with cross-correlation: Evaluating automated labeling of elderly and neurodegenerative brain," Medical Image Analysis, vol. 12, 2008, pp. 26-41, XP022459102.
Feng, W. et al., "A dual propagation contours technique for semi-automated assessment of systolic and diastolic cardiac function by CMR," Journal of Cardiovascular Magnetic Resonance, vol. 11, No. 30, 2009, pp. 1-13, XP021059180.
Khalvati, F. et al., "Inter-slice bidirectional registration-based segmentation of the prostate gland in MR and CT image sequences," Medical Physics, vol. 40, No. 12, Dec. 2013, pp. 123503-1-123503-11, 12 total pages, XP055418662.
Barnouin, Y. et al., "Manual Segmentation of Individual Muscles of the Quadriceps Femoris Using MRI: A Reappraisal," Journal of Magnetic Resonance Imaging, vol. 40, 2014, pp. 239-247, 10 total pages.
Baudin, P.-Y. et al., "Automatic skeletal muscle segmentation through random walks and graph-based seed placement," International Symposium Biomedical Imaging (ISBI), May 2012, pp. 1036-1039, 5 total pages.
Gilles, B. et al., "Anatomical Modelling of the Musculoskeletal System from MRI," Proceedings of International Conference on Medical Image Computing and Computer-Assisted Intervention, vol. 9, pp. 289-296.
Prescott, J. W. et al., "Anatomically Anchored Template-Based Level Set Segmentation: Application to Quadriceps Muscles in MR Images from the Osteoarthritis Initiative," J Digit Imaging, vol. 24, No. 1, Feb. 2011, pp. 1-32.
Ahmad, E. et al., "Atlas-registration based image segmentation of MRI human thigh muscles in 3-D space," Proceedings of SPIE—The International Society for Optical Engineering, vol. 9037, Apr. 2014, pp. 90371L-1-90371L-1-12, 13 total pages.

\* cited by examiner

METHOD AND DEVICE FOR SEGMENTING IMAGES BY AUTOMATIC PROPAGATION INTO AN (N+1)-TH DIMENSION OF AN IMAGE SEGMENTATION INITIALIZED IN DIMENSION N

The present invention relates to a method for automatic propagation into an (N+1)-th dimension of an image segmentation initialized in dimension N, N≥2, to obtain a final segmentation of dimension N+1 in an ordered series of image representations. It also relates to a corresponding computer program and a device for acquiring and segmenting images implementing this method.

The invention applies more particularly to a method comprising the following steps:
  acquisition of the ordered series, in said (N+1)-th dimension, of image representations of dimension N,
  initial segmentation in dimension N of a region of interest in the first and last image representations of the ordered series, to respectively obtain first and last initial segmentation masks of the region of interest.

The term "image representation of dimension N", where N≥2, denotes a representation of dimension N≥2, optionally including a temporal dimension or a modal acquisition dimension (certain imaging techniques, such as magnetic resonance imaging, enabling a plurality of acquisition modalities), wherein at least two of the dimensions are spatial so as to include at least one two-dimensional image per representation.

The term "ordered series of image representations" denotes the extension in an (N+1)-th dimension, that of the ordered series, of the image representations which are each of dimension N. This (N+1)-th dimension may be spatial (a plurality of successive acquisitions offset in a spatial dimension), temporal (a plurality of successive acquisitions offset over time) or modal (a plurality of successive acquisitions according to different imaging modalities).

Image segmentation techniques are closely linked with applications and acquisition modes. In some very favorable cases, known supervised automatic or semi-automatic segmentation techniques make it possible to obtain good results. The term "supervised semi-automatic segmentation" denotes particularly the option of carrying out in a supervised manner, for example manually, an initial segmentation in dimension N in at least one image representation of an ordered series of successive image representations, then automatically propagating this initial segmentation to image representations that are not initially segmented using registration algorithms between image representations. Propagation techniques by means of active contours and mathematical morphology, by non-linear registration for estimating diffeomorphic deformations, etc., are well known and frequently prove to be effective.

However, in imaging of the human or animal body, and particularly in magnetic resonance imaging (MRI) of muscles or nerves, these techniques are unequal and insufficient to quantify, for example in terms of volume measurement, morphometry, fatty infiltrate fraction and other specific parameters, the neuromuscular regions of interest. It is indeed very difficult to propagate longitudinally (spatially, temporally or even in a multi-modal dimension) the segmentations of such regions of interest. However, if the extraction and analysis of quantitative parameters in these regions were feasible, multiple prospects and new challenge could emerge particularly for applications in the medical field but also in the field of sport.

Thus, for example, the article by Barnouin et al, entitled "Manual segmentation of individual muscles of the quadriceps femoris using MRI: a reappraisal", published in Journal of Magnetic Resonance Imaging, volume 40, pages 239-247, July 2014, teaches in this specific case a rigorous method for performing a succession of manual segmentations in an ordered series of MRI cross-sections of the thigh. Obviously, this method makes it possible to obtain optimal volumetric segmentation. However, it is very costly in time and human resources required.

Further automatic or semi-automatic methods, involving graph-based random walk techniques, of model deformations or registration on segmented single or multiple atlas images, have been tested in neuromuscular MRI imaging without exhibiting probative or precise results for small regions of interest. For example, mention may be made of the following documents:
  the article by Baudin et al, entitled "Automatic skeletal muscle segmentation through random walks and graph-based seed placement", published in Proceedings of International Symposium on Biomedical Imaging, pages 1036-1039, May 2012,
  the article by Gilles et al, entitled "Anatomical modelling of the musculoskeletal system from MRI", published in Proceedings of International Conference on Medical Image Computing and Computer-Assisted Intervention, volume 9, pages 289-296, 2006,
  the article by Prescott et al, entitled "Anatomically anchored template-based level set segmentation: application to quadriceps muscles in MR images from the osteoarthritis initiative", published in Journal of Digital Imaging, volume 24, No. 1, pages 28-43, February 2011,
  the article by Ahmad et al, entitled "Atlas-registration based image segmentation of MRI human thigh muscles in 3-D space", published in Proceedings of SPIE—International Society for Optical Engineering, volume 9037, pages 90371L-1 to 90371 L-12, February 2011.

It may thus be sought to envisage a method for automatic propagation of an image segmentation which is suitable for doing away with at least some of the problems and constraints mentioned above.

There is therefore proposed a method for automatic propagation into an (N+1)-th dimension of an image segmentation initialized in dimension N, N≥2, to obtain a final segmentation of dimension N+1 in an ordered series of image representations, comprising the following steps:
  acquisition of the ordered series, in said (N+1)-th dimension, of image representations of dimension N,
  initial segmentation in dimension N of a region of interest in the first and last image representations of the ordered series, to respectively obtain first and last initial segmentation masks of the region of interest,
further comprising the following steps:
  estimation of registration parameters between the first and last initial segmentation masks of the region of interest,
  upward automatic propagation of the initial segmentation of the region of interest, from the first image representation, to all the other image representations of the ordered series by step-by-step registration up to the last,
  downward automatic propagation of the initial segmentation of the region of interest, from the last image representation, to all the other image representations of the ordered series by step-by-step registration up to the first, and combination of the upward and downward automatic propagations with one another using a reference frame change, between the first and last image representations, obtained by applying the estimated registration parameters.

It is well known that a segmentation propagation method based on successive registrations is suitable for providing very good results in the first iterations while drifting rapidly due to errors accumulated following the registrations, whereas a method based on linear interpolation between first and last segmentation masks, provides superior convergence while drifting potentially significantly between the two, and especially if the deformations of the segmented region of interest deviate from a linear deformation model. The method proposed according to the present invention thus makes it possible to prevent any pitfalls by cleverly combining dual propagation based on successive upward and downward registrations with an overall registration, imposing the convergence of the propagations at the ends of the ordered series as a linear interpolation would do. It further surprisingly produces superior results, compared with an entirely manual reference segmentation method, than each of the best results of the registrations that it combines when taken independently.

Optionally, the combination of the upward and downward automatic propagations with one another using said reference frame change is further carried out using predetermined weighting coefficients applied to the results of the upward and downward propagations, these coefficients including:
decreasing coefficients from the first to the last image representation for the upward automatic propagation, and
decreasing coefficients from the last to the first image representation for the downward automatic propagation.

Also optionally:
the registration between the first and last initial segmentation masks of the region of interest the parameters of which are estimated is a non-linear registration, particularly a symmetric diffeomorphic registration, and
each step-by-step registration executed for each upward or downward automatic propagation is a non-linear registration, particularly a symmetric diffeomorphic registration, calculated between two successive image representations of the ordered series.

Also optionally:
the upward and downward automatic propagations comprise the calculation of upward and downward specific displacement fields between, on one hand, respectively the first and last image representations, and, on the other, each of the other image representations of the ordered series, and
the combination of the upward and downward automatic propagations with one another comprises:
an enhancement of the calculation of the upward specific displacement fields by accounting for the downward specific displacement fields using a reference frame change obtained by applying the registration parameters from the first to the last initial segmentation mask of the region of interest, and
an enhancement of the calculation of the downward specific displacement fields by accounting for the upward specific displacement fields using a reference frame change obtained by applying the registration parameters from the last to the first initial segmentation mask of the region of interest.

Also optionally:
the combination of the upward and downward automatic propagations with one another further comprises an additional combination of the enhanced upward and downward specific displacement fields using the reference frame change, between the first and last image representations, obtained by applying the estimated registration parameters, to obtain optimized upward or downward displacement fields, and
segmentation masks are obtained on all the image representations of the ordered series by applying these optimized upward or downward displacement fields to the first initial segmentation mask of the first image or to the last initial segmentation mask of the last image.

Also optionally:
the initial segmentation in dimension N is carried out on a plurality of regions of interest in the first and last image representations of the ordered series, to respectively obtain first and last initial segmentation masks of each region of interest, and
the estimation of the registration parameters, the upward and downward automatic propagations as well as the combination thereof with one another are carried out for each initially segmented region of interest.

Also optionally:
a long ordered series, in said (N+1)-th dimension, of image representations of dimension N is previously acquired and subdivided into a plurality of successive ordered series,
the initial segmentation in dimension N of the region of interest is carried out in the first and last image representations of each ordered series, knowing that the first image representation of each ordered series from the second is also the last image representation of the preceding ordered series, and
the estimation of the registration parameters, the upward and downward automatic propagations as well as the combination thereof with one another are carried out for each ordered series of the long ordered series.

Also optionally, the acquisition is a mono- or multi-modal MRI image acquisition, each image representation including N=2, 3 or 4 dimensions among:
at least two of three possible spatial dimensions,
a temporal dimension, and
a modal dimension,
the ordered series being acquired in the (N+1)-th dimension selected among:
one of the three possible spatial dimensions,
the temporal dimension, and
the modal dimension.

There is also proposed a computer program downloadable from a communication network and/or recorded on a computer-readable medium and/or executable by a processor, comprising instructions for executing the steps of a method for automatic propagation of an image segmentation according to the invention, when said program is executed on a computer.

There is also proposed a device for acquiring and segmenting images by automatic propagation into an (N+1)-th dimension of an image segmentation initialized in dimension N, N≥2, to obtain a final segmentation of dimension N+1 in an ordered series of image representations, comprising:
means for acquisition of an ordered series, in said (N+1)-th dimension, of image representations of dimension N, a memory for storing first and last respective initial segmentation masks in dimension N of a region of interest in the first and last image representations of the ordered series, further comprising a processor programmed to:
  estimate registration parameters between the first and last initial segmentation masks of the region of interest,
  upwardly automatically propagate the initial segmentation of the region of interest, from the first image representation, to all the other image representations of the ordered series by step-by-step registration up to the last,
  downwardly automatically propagate the initial segmentation of the region of interest, from the last image representation, to all the other image representations of the ordered series by step-by-step registration up to the first, and
  combine the upward and downward automatic propagations with one another using a reference frame change, between the first and last image representations, obtained by applying the estimated registration parameters.

Figure 2:
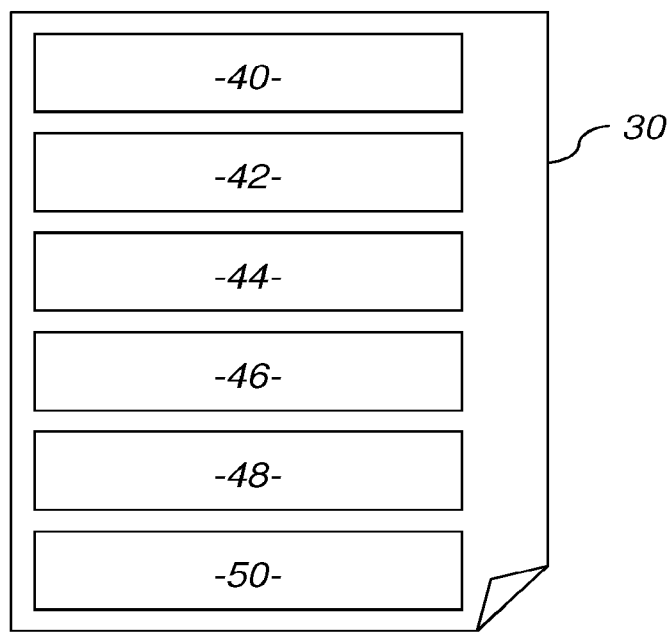
Figure 3:
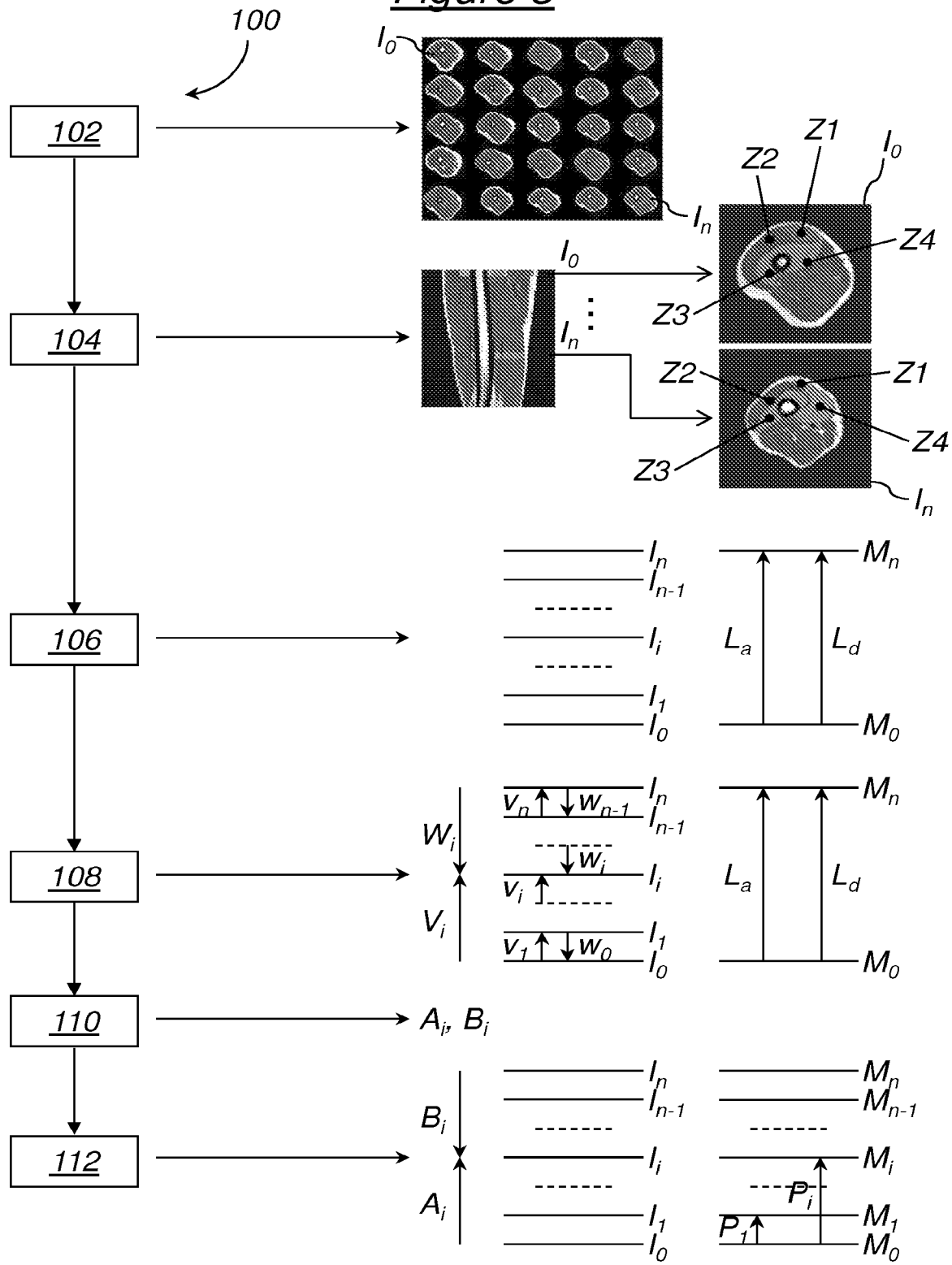
Figure 4:
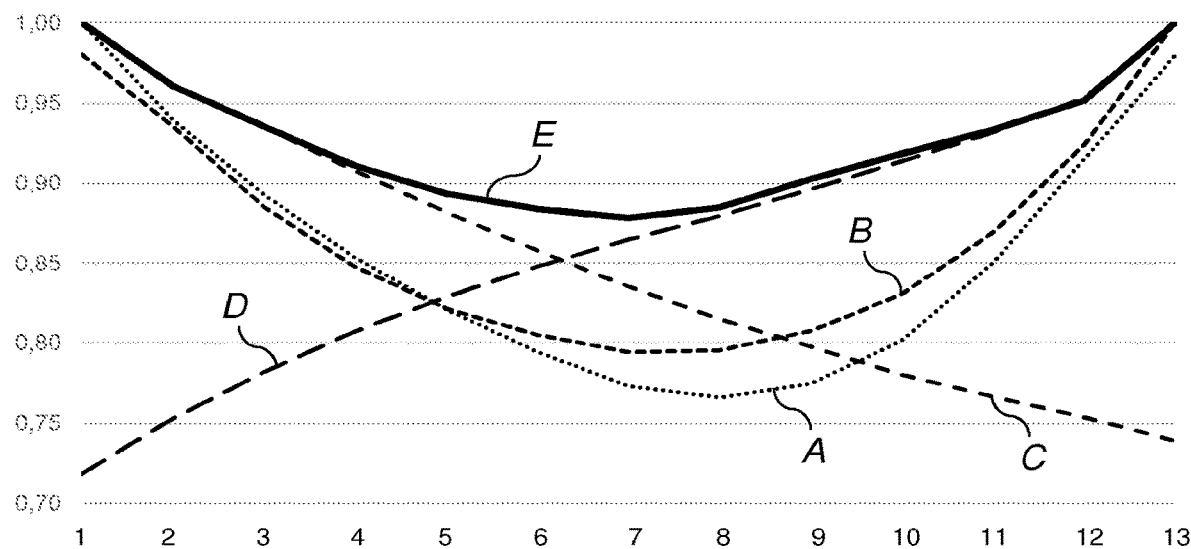
Figure 5:
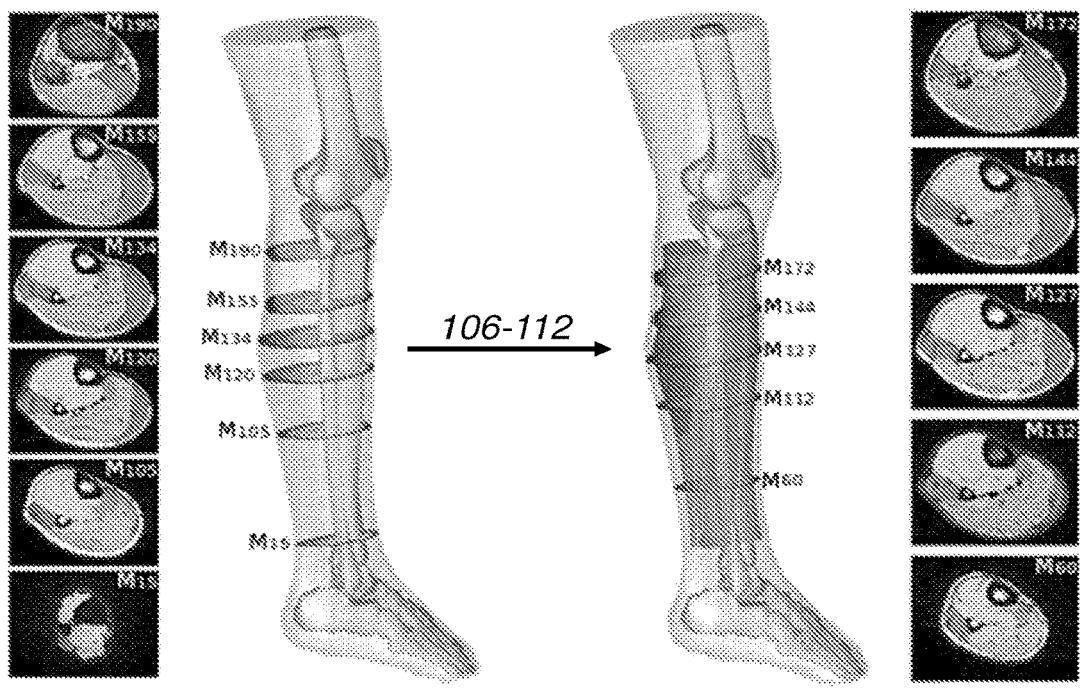

The invention will be understood more clearly using the following description, given merely by way of example and with reference to the appended drawings wherein:

FIG. 1 represents schematically the general structure of a device for acquiring and segmenting images according to an embodiment of the invention, FIG. 2 illustrates a illustrates a sequence of instructions of a computer program in memory in the device in FIG. 1, FIG. 3 illustrates the successive steps of a method of automatic propagation of an image segmentation executed by a processor of the device in FIG. 1 following the instructions of the program in FIG. 2, FIG. 4 illustrates a diagram of experimental results, and FIG. 5 illustrates a generalization of the method in FIG. 3.

The device 10 for acquiring and segmenting images represented schematically in FIG. 1 is merely a non-limiting example of a device suitable for implementing a method of automatic propagation of an image segmentation according to the present invention. It consists of a magnetic resonance imaging (MRI) device comprising an acquisition apparatus 12 and a control and processing device 14, connected to one another in data transmission.

The acquisition apparatus 12 comprises for example, in a manner known per se, a tunnel 16 surrounded by a cylindrical magnet 18, wherein slides in controlled translation a bed 20 whereon an observation subject 22, particularly a human or animal, is reclined for the imaging of a part of their body, for example a thigh.

The control and processing device 14 comprises a computing device 24 programmed for the control of the acquisition apparatus 12, i.e. for the transmission of control signals. This computing device 24 is further programmed for the processing of measurement signals returned by the acquisition apparatus 12. It has a central processing unit 26, such as a microprocessor designed to transmit and receive respectively the control and measurement signals, and a memory 28 wherein a computer program 30 is saved. The memory 28 further comprises a zone 32 for storing data processed or to be processed by the processing unit 26 upon execution of the program 30.

The control and processing device 14 further comprises elements for interactivity with a practitioner such as an MRI image acquisition expert. These elements include a display screen 34, a keyboard 36 and a computer pointing device such as a mouse 38.

According to a perfectly known and controlled technology, the acquisition apparatus 12 is designed to generate a magnetic field in the tunnel 16 and to obtain therefrom, on command from the device 14 controlled by the practitioner, the three-dimensional imaging of a volume portion of the exposed human or animal. This portion, for example a thigh, is illustrated by the hatched zone between dotted lines in FIG. 1. By configuring the acquisition apparatus 12 using the control and processing device 14, the practitioner defines the overall thickness of the volume sought, a number of cross-sections sought or a distance sought between each cross-section, the thickness of each cross-section and the resolution of each cross-section. As many parallel images as those sought are thus obtained from three-dimensional imaging of an entire human or animal body portion volume.

One is placed therefore herein in the particular case of an MRI acquisition of a longitudinally ordered series of transversal two-dimensional images of a thigh or a calf of the observation subject 22. Such an acquisition makes it possible to visualize the volume of organs such as muscles or nerves. One aim of the invention is that of being able to provide precise segmentation to access quantitative data of volumes, shapes or other relevant parameters for medical or sports applications for example. The general principle followed by a method according to the invention applied to the context of FIG. 1 is that of starting from a spatially two-dimensional initial segmentation of at least one region of interest carried out in some of the images of the ordered series, to automatically propagate this two-dimensional initial segmentation to the other images of the series acquired to thus obtain a spatially three-dimensional final segmentation.

Alternatively, the same cross-section could be acquired according to an ordered series of successive times so as to obtain spatially two-dimensional volume imaging but also with a temporal dimension. Also alternatively, the same cross-section could be acquired according to an ordered series of successive acquisition modes so as to obtain spatially two-dimensional volume imaging but also with a modal dimension. In all these cases, the general principle followed by a method according to the invention applied to the context in FIG. 1 remains that of starting from a spatially two-dimensional initial segmentation of at least one region of interest carried out in some of the images of the ordered series, to automatically propagate this two-dimensional initial segmentation to the other images of the series acquired to thus obtain a spatially three-dimensional final segmentation, the third dimension being spatial, temporal or modal.

Even more generally, the principle followed by a method according to the invention is that of starting from an initial segmentation of dimension N, N≥2, of at least one region of interest carried out in some of the image representations of an ordered series in an (N+1)-th dimension, to automatically propagate this initial segmentation of dimension N to the other image representations of the series acquired so as to thus obtain a final segmentation of dimension N+1, the (N+1)-th dimension being spatial, temporal or modal.

In concrete terms, when the acquisition is a mono- or multi-modal MRI image acquisition, each image representation includes N=2, 3 or 4 dimensions among:
  at least two of three possible spatial dimensions,
  a temporal dimension, and
  a modal dimension, the ordered series being acquired in the (N+1)-th dimension selected among:
one of the three possible spatial dimensions,
the temporal dimension, and
the modal dimension.

The computer program 30 is detailed sequentially in FIG. 2. It firstly comprises instructions 40 to acquire an ordered series, in the longitudinal direction cited above, of n+1 transversal images (n≥2) annotated $I_0, \ldots, I_i, \ldots, I_n$ of a thigh of the observation subject 22. These instructions comprise a request of the interactivity elements 34, 36, 38 so that the practitioner can define certain acquisition parameters themselves. The ordered sequence acquired may be stored in memory 28 in the storage zone 32.

The computer program 30 further comprises instructions 42 for carrying out a two-dimensional initial segmentation of at least one region of interest in the first and last images of the ordered series, to obtain a first initial segmentation mask of each region of interest in the first image of the ordered series and a last initial segmentation mask of each region of interest in the last image of the ordered series. Similarly, these instructions advantageously comprise a request of the interactivity element 34, 36, 38 so that the practitioner can themselves take part in carrying out this initial segmentation, for example according to the teaching of manual segmentation detailed in the document cited above by Barnouin et al. Alternatively, the initial segmentation may be semi-automatic and supervised or automatic according to any one of the teachings of the prior art. The initial segmentation masks thus obtained may be stored in memory 28 in the storage zone 32.

The computer program 30 further comprises instructions 44 for estimating registration parameters between the first and last initial segmentation masks of each region of interest as obtained by executing the instructions 42. These parameters are estimated automatically then saved in table format wherein the coefficients indicate for each pixel of the initial segmentation mask of the initial image, displacement values toward a corresponding pixel of the initial segmentation mask of the target image. These tables are known as "displacement fields" and represent transformations obtained from the sought registration. Considering a given region or interest or a set of given regions of interest, a first displacement field comprises displacement coefficients of the first initial segmentation mask of this region of interest or of this set of regions of interest in the first image of the ordered series in order to register same on the last initial segmentation mask of this same region of interest or of this same set in the last image. This first displacement field may be described as an upward overall displacement field and will hereinafter be annotated as $L_a$. Considering the same given region of interest or the same set of given regions of interest, a second displacement field comprises displacement coefficients of the last initial segmentation mask of this region of interest or of this set in the last image of the ordered series in order to register same on the first initial segmentation mask of this region of interest or of this set in the first image. This second displacement field may be described as a downward overall displacement field and will hereinafter be annotated as $L_d$. The registration technique will not be detailed because there are a large number thereof that a person skilled in the art is capable of choosing according to the target application. In the field of MRI neuromuscular images, it is advantageous to use models based on non-linear transformations, for example a symmetric diffeomorphic transformation-based registration as disclosed in the article by Avants et al, entitled "Symmetric diffeomorphic image registration with cross-correlation: evaluating automated labeling of elderly and neurodegenerative brain", published in Medical Image Analysis, volume 12, No. 1, pages 26-41, February 2008.

It will be noted that the upward overall displacement field $L_a$ actually makes it possible to carry out a reference frame change, starting from a first reference frame linked with the first initial segmentation mask of the first image to be positioned in a last reference frame linked with the last initial segmentation mask of the last image. Conversely, the downward overall displacement field $L_d$ makes it possible to carry out a reference frame change, starting from the last reference frame linked with the last initial segmentation mask of the last image to be positioned in the first reference frame linked with the first initial segmentation mask of the first image.

The computer program 30 further comprises instructions 46 for automatically propagating the initial segmentations of each region of interest to all the images of the ordered series by step-by-step registration. Thus, these instructions are defined so that the processing unit 26 can execute upward automatic propagation of the initial segmentation of each region of interest, from the first image, to all the other images of the ordered series by step-by-step registration up to the last image. Similarly, they are further defined so that the processing unit 26 can execute downward automatic propagation of the initial segmentation of each region of interest, from the last image, to all the other images of the ordered series by step-by-step registration up to the first image. As above, the registration technique will not be detailed because there are a large number thereof that a person skilled in the art is capable of choosing according to the target application. It is herein once again advantageous to use models based on non-linear transformations, for example symmetric diffeomorphic transformation-based registration as disclosed in the article cited above by Avants et al. Each transformation resulting from a sought registration is calculated between two successive images of the ordered series and produces a local displacement field between these two images. A transformation suitable for carrying out a registration between two non-successive images may then be obtained by composing estimated successive transformations between these two images to produce a specific displacement field between these two images. In particular, an upward specific transformation suitable for carrying out an upward registration between the first image of the ordered series and any other image may be obtained by composing estimated successive upward transformations between these two images, i.e. successive upward local displacement fields. Similarly, a downward specific transformation suitable for carrying out a downward registration between the last image of the ordered series and the same any other image may be obtained by composing estimated successive downward transformations between these two images, i.e. successive local displacement fields. These two specific transformations may be advantageously combined with one another.

The computer program 30 therefore comprises instructions 48 for combining with one another the upward and downward automatic propagations as obtained by executing the instructions 46. In particular, the instructions 48 are defined to combine the two upward and downward specific transformations defined above for each of the images of the ordered series. This combination may be carried out by means of the reference frame changes enabled by the calculations made by executing the instructions 44, i.e. by the upward overall displacement field $L_a$ and by the downward overall displacement field $L_d$. There results a possible enhancement of the upward registrations by accounting for the corresponding downward registrations by means of the reference frame change feasible using the upward overall displacement field $L_a$: enhanced upward specific displacement fields are thus obtained. There also results a possible enhancement of the downward registrations by accounting for the corresponding registrations by means of the reference frame change feasible using the downward overall displacement field $L_d$: enhanced downward specific displacement fields are thus obtained.

This combination of the upward and downward automatic propagations is further advantageously carried out using predetermined weighting coefficients applied to the results of the upward and downward propagations, i.e. to the corresponding upward and downward displacement fields. Preferably, these coefficients decrease from the first to the last image for the upward automatic propagation and decrease from the last to the first image for the downward automatic propagation. They thus advantageously account for probable drifts of the automatic propagations when they move away from the reference image thereof.

Finally, the computer program 30 comprises instructions 50 for combining with one another the enhanced upward and downward specific displacement fields as calculated by executing the instructions 48, once again by means of the reference frame changes enabled by the calculations carried out by executing the instructions 44 and using the predetermined weighting coefficients stated above. This combination makes it possible to obtain optimized upward or downward specific displacement fields applicable to the first initial segmentation mask of the first image, or to the last initial segmentation mask of the last image, to obtain segmentation masks on all the images of the ordered series. These instructions are obviously applicable to each region of interest in question or to each set of regions of interest in question.

With reference to FIG. 3, a method 100 of automatic propagation of an image segmentation implemented by the device 10 in FIG. 1 by executing the instructions in FIG. 2 will now be detailed.

During a first step 102, carried out in accordance with the execution of the instructions 40 by the processing unit 26, the n+1 ordered images $I_0, \ldots, I_i, \ldots, I_n$ are obtained by command from the acquisition apparatus 12. They are saved in the storage zone 32.

Then, during a step 104, carried out according to the execution of the instructions 42 by the processing unit 26, the first and last images $I_0$ and $I_n$ are initially segmented to obtain a first initial segmentation mask of each region of interest in the first image $I_0$ and a last initial segmentation mask of each region of interest in the last image $I_n$. As for example illustrated in FIG. 3, four regions of interest are segmented manually in the first image $I_0$ by the practitioner and labelled Z1, Z2, Z3 and Z4, to obtain four first initial segmentation masks. Four corresponding regions of interest are similarly segmented manually in the last image $I_n$ by the practitioner and labelled Z1, Z2, Z3 and Z4, to obtain four last initial segmentation masks.

The following steps 106, 108, 110 and 112 may be executed independently for each of the regions of interest Z1, Z2, Z3 and Z4, or jointly for any set of regions of interest in question. There will therefore be annotated as Z any one of these regions of interest or any one of these sets of regions of interest, $M_0$ the first initial segmentation mask of this region or of this set of interest Z in the first image $I_0$ and $M_n$ the last initial segmentation of this region or this set of interest Z in the last image $I_n$.

During the step 106, carried out according to the execution of the instructions 44 by the processing unit 26, the registration parameters between the initial segmentation masks $M_0$ and $M_n$ are estimated in the form of upward and downward overall displacement fields $L_a$ and $L_d$. Annotating as Reg the registration transformation used, this step consists, in a preferred embodiment, of executing the following instructions:

$$L_a = \text{Reg}(M_0, M_n)$$

$$L_d = \text{Reg}(M_n, M_0)$$

During the step 108, carried out according to the execution of the instructions 46 by the processing unit 26, the initial segmentations are propagated step-by-step by the same registration transformation Reg, but this time applied to the images. Annotating as $v_i$ the estimated upward local displacement field between the images $I_{i-1}$ and $I_i$, $w_i$ the estimated downward local displacement field between the images $I_{i+1}$ and $I_i$, $V_i$ the estimated upward specific displacement field between the images $I_1$ and $I_i$, $W_i$ the estimated downward specific displacement field between the images $I_n$ and $I_i$, "o" the symbol of the function composition applied to the displacement fields and Id the zero displacement field registering an image on itself, this step consists, in a preferred embodiment, of executing the following instructions:

$$V_0 = W_n = Id$$

For i ranging from 1 to n:

$$v_i = \text{Reg}(I_{i-1}, I_i)$$

$$V_i = v_i \circ V_{i-1}$$

$$w_{n-i} = \text{Reg}(I_{n+1-i}, I_{n-i})$$

$$W_{n-i} = w_{n-i} \circ W_{n+1-i}$$

End of Loop

During the step 110, carried out according to the execution of the instructions 48 by the processing unit 26, the upward and downward automatic propagations previously obtained, i.e. the upward and downward specific displacement fields $V_i$ and $W_{n-i}$, for i ranging from 1 to n, are enhanced by combinations with one another via reference frame changes enabled by the upward and downward overall displacement fields $L_a$ and $L_d$. Annotating as $A_i$ the calculated enhanced upward specific displacement field between the images $I_1$ and $I_i$, $B_i$ the calculated enhanced downward specific displacement field between the images $I_n$ and $I_i$, $\alpha_i$ the upward weighting coefficients and $\beta_i$ the downward weighting coefficients, this step consists, in a preferred embodiment, of executing the following instructions:

$$A_0 = B_n = Id$$

For i ranging from 1 to n:

$$A_i = \alpha_i (v_i \circ A_{i-1}) + \beta_i (W_i \circ L_a)$$

$$B_{n-i} = \beta_i (w_{n-i} \circ B_{n+1-i}) + \alpha_{n-i}(V_{n-i} \circ L_d)$$

End of Loop

The choice of weighting coefficients is dependent on the envisaged application. A particularly suitable choice for the propagation of a segmentation of muscular region of interest in a series of MRI images of an upper or lower limb of an observed human or animal is as follows for any index i between 0 and n:

$$\alpha_i = [\tan^{-1}(-i+n/2)]/\pi + 0.5$$

$$\beta_i = [\tan^{-1}(i-n/2)]/\pi + 0.5$$

Finally, during the step 112, carried out according to the execution of the instructions 50 by the processing unit 26, the enhanced upward and downward specific displacement fields as calculated by executing the instructions 48 are combined with one another to obtain optimized upward or downward specific displacement fields. Annotating as $P_i$ the calculated optimized upward specific displacement field between the images $I_1$ and $I_i$, and $M_i$ the segmentation mask resulting from the region of interest Z in the image $I_i$, this step consists, in a preferred embodiment, of executing the following instructions:

For i ranging from 1 to n:

$$P_i = \alpha_i A_i + \beta_i (\beta_i \circ L_a)$$

$$M_i = P_i(M_0)$$

End of Loop

Alternatively and similarly, annotating as $Q_i$ the calculated optimized downward specific displacement field between the images $I_n$ and $I_i$, the step 112 may consist, in a preferred embodiment, of executing the following instructions:

For i ranging from 1 to n:

$$Q_{n-i} = \beta_i B_{n-i} + \alpha_{n-i}(A_{n-i} \circ L_d)$$

$$M_{n-i} = Q_{n-i}(M_n)$$

End of Loop

Using this procedure, it is possible to propagate the initial segmentation masks to the entire ordered series.

Experimental tests were conducted on ordered series of thigh muscle MRI images of an observation subject and results are illustrated for a series of thirteen MRI images in FIG. 4. In this series, only the first and last images were initially segmented manually for a region of interest. The results of a plurality of automatic propagations of the manual segmentations are compared by calculating the DICE similarity coefficient thereof with an entirely manual segmentation of the series.

Curve A with finely dotted lines gives the DICE coefficients for an upward segmentation propagation by linear interpolation carried out using the overall displacement field $L_a$ based on the manual segmentation of the first image: obviously, this curve converges at the ends of the series but drifts rapidly and significantly between the two. Curve B with short dashed lines gives the DICE coefficients for a downward segmentation propagation by linear interpolation carried out using the overall displacement field $L_d$ based on the manual segmentation of the last image: obviously, this curve also converges at the ends of the series but drifts rapidly and significantly between the two. Curve C with medium dotted lines gives the DICE coefficients for an upward segmentation propagation using the displacement fields $V_i$ calculated in the step 108 starting from the manual segmentation of the first image: this curve drifts markedly less rapidly than curve A at the series start, but continues to drift throughout the series until it diverges significant at series end. Curve D with long dashed lines gives the DICE coefficient for a downward segmentation propagation using the displacement fields $W_i$ calculated in the step 108 starting from the manual segmentation of the last image: this curve also drifts markedly less rapidly than curve B at series end, but continues to drift throughout the series until it diverges significantly at the series start. Finally, curve E with a solid line gives the DICE coefficients for a segmentation propagation carried out according to the method 100 described above. This curve always remains above the four others. It should even be noted that it exhibits markedly superior results to each of the best results of the other curves in mid-series.

FIG. 5 illustrates a generalization of the method in FIG. 3. According to this generalization, a long ordered series of for example one hundred and seventy-six MRI images, annotated as $I_{15}$ to $I_{190}$, is acquired in step 102 and subdivided into a plurality of successive ordered series. Five successive ordered series are thus defined: a first ordered series of the images $I_{15}$ to $I_{105}$, a second ordered series of the images $I_{105}$ to $I_{120}$, a third ordered series of the images $I_{120}$ to $I_{134}$, a fourth ordered series of the images $I_{134}$ to $I_{155}$, a fifth ordered series of the images $I_{155}$ to $I_{190}$.

The step 104 is applied to each of these five series, such that an initial segmentation of regions of interest is carried out in the images $I_{15}$, $I_{105}$, $I_{120}$, $I_{134}$, $I_{155}$ and $I_{190}$ to provide initial segmentation masks $M_{15}$, $M_{105}$, $M_{120}$, $M_{134}$, $M_{155}$ and $M_{190}$, as illustrated in the left section of FIG. 5.

The steps 106 to 112 are also applied to each of these five series and for each of the regions of interest thereof. This makes it possible to obtain all the other segmentation masks by automatic propagation according to the principles of the present invention, for example the segmentation masks $M_{60}$, $M_{112}$, $M_{127}$, $M_{144}$ and $M_{172}$ illustrated in the right section of FIG. 5.

It clearly appears that a device for acquiring and segmenting images such as that described above makes it possible to obtain very satisfactory results in propagation-based segmentation of initial segmentation masks on difficult data such as series of muscle MRI image representations, with multiple applications in medicine and sports monitoring.

It will further be noted that the invention is not limited to the embodiment described above. It will indeed be obvious to a person skilled in the art that various modifications may be made to the embodiment described above, in the light of the teaching disclosed herein.

In particular, the computer program instructions described above have been presented as included in a single computer program. However, they may more generally be grouped together or separated according to any possible combinations in one or a plurality of software programs. The distinction thereof is furthermore purely functional. Finally, the functions thereof could also be in part microprogrammed or microwired in dedicated integrated circuits. Thus, alternatively, the computing device 24 using the processing unit 26 could be replaced by an electronic device composed solely of digital circuits (with no computer program) for carrying out the same actions.

Moreover, the principles of the invention are applicable to imaging fields other than MRI.

As a general rule, in the following claims, the terms used must not be interpreted as limiting the claims to the embodiment disclosed in the present description, but must be interpreted to include therein all the equivalents that the claims intend to cover due to the wording thereof and which may be foreseen within the scope of a person skilled in the art by applying their general knowledge to implementing the teaching disclosed above.

The invention claimed is:

1. A method for automatic propagation into an (N+1)-th dimension of an image segmentation initialized in dimension N, N≥2, to obtain a final segmentation of dimension N+1 in an ordered series of image representations, comprising:

acquiring the ordered series in said (N+1)-th dimension, of image representations of dimension N, initially segmenting in dimension N of a region of interest in the first and last image representations of the ordered series, to respectively obtain first and last initial segmentation masks ($M_0$, $M_n$) of the region of interest, estimating
- parameters of an overall upward registration of the first mask on the last mask of initial segmentation of the region of interest, and
- parameters of an overall downward registration of the last mask on the first mask of initial segmentation of the region of interest, upwardly automatically propagating the initial segmentation of the region of interest, from the first image representation, to all the other image representations of the ordered series by step-by-step registration up to the last image representation, downwardly automatically propagating the initial segmentation of the region of interest, from the last image representation, to all the other image representations of the ordered series by step-by-step registration up to the first image representation, and combining the upward and downward automatic propagations with one another, wherein the combination of the upward and downward automatic propagations with one another is carried out using a reference frame change, between the first and last image representations, by applying the estimated overall upward registration parameters to a result of the downward automatic propagation calculated for each image representation of the ordered series other than the first image representation and the last image representation, for a combination with a result of the upward automatic propagation also calculated for each image representation of the ordered series other than the first image representation and the last image representation, and by applying the estimated overall downward registration parameters to said result of the upward automatic propagation for a combination with said result of the upward automatic propagation.

2. The method according to claim 1, wherein the combination of the upward and downward automatic propagations with one another using said reference frame change is further carried out using predetermined weighting coefficients applied to the results of the upward and downward propagations, these coefficients including:

decreasing coefficients from the first to the last image representation for the upward automatic propagation, and decreasing coefficients from the last to the first image representation for the downward automatic propagation.

3. The method according to claim 1, wherein:

the overall upward and overall downward registrations the parameters of which are estimated are non-linear registrations, particularly symmetric diffeomorphic registrations, and each step-by-step registration executed for each upward or downward automatic propagation is a non-linear registration, particularly a symmetric diffeomorphic registration, calculated between two successive image representations of the ordered series.

4. The method according to claim 1, wherein:

the upward and downward automatic propagations comprise the calculation of upward and downward specific displacement fields between, on one hand, respectively the first and last image representations, and, on the other hand, each of the other image representations of the ordered series, and the combination of the upward and downward automatic propagations with one another comprises:

an enhancement of the calculation of the upward specific displacement fields by accounting for the downward specific displacement fields using a reference frame change obtained by applying the overall upward registration parameters, and an enhancement of the calculation of the downward specific displacement fields by accounting for the upward specific displacement fields using a reference frame change obtained by applying the overall downward registration parameters.

5. The method according to claim 4, wherein:

the combination of the upward and downward automatic propagations with one another further comprises an additional combination of the enhanced upward and downward specific displacement fields using the reference frame change, between the first and last image representations, obtained by applying the overall upward or overall downward registration parameters, to obtain optimized upward or downward displacement fields, and segmentation masks are obtained on all the image representations of the ordered series by applying these optimized upward or downward displacement fields to the first initial segmentation mask of the first image or to the last initial segmentation mask of the last image.

6. The method according to claim 1, wherein:

the initial segmentation in dimension N is carried out on a plurality of regions of interest in the first and last image representations of the ordered series, to respectively obtain first and last initial segmentation masks of each region of interest, and the estimation of the registration parameters, the upward and downward automatic propagations as well as the combination thereof with one another are carried out for each initially segmented region of interest.

7. The method according to claim 1, wherein:

a long ordered series, in said (N+1)-th dimension, of image representations of dimension N is previously acquired and subdivided into a plurality of successive ordered series, the initial segmentation in dimension N of the region of interest is carried out in the first and last image representations of each ordered series, the first image representation of each ordered series from the second being also the last image representation of the preceding ordered series, and the estimation of the registration parameters, the upward and downward automatic propagations as well as the combination thereof with one another are carried out for each ordered series of the long ordered series.

8. The method according to claim 1, wherein the acquiring is a mono- or multi-modal MRI image acquisition, each image representation including N=2, 3 or 4 dimensions among:
at least two of three possible spatial dimensions, a temporal dimension, and a modal dimension, the ordered series ($I_0$, ..., $I_i$, ..., $I_n$) being acquired in the (N+1)-th dimension selected among:
one of the three possible spatial dimensions, the temporal dimension, and the modal dimension.

9. A computer program recorded on a non-transitory computer-readable medium executable by a processor, wherein the computer program comprises instructions for executing the steps of the method according to claim 1 on a computer.

10. A device for acquiring and segmenting images by automatic propagation into an (N+1)-th dimension of an image segmentation initialized in dimension N, N≥2, to obtain a final segmentation of dimension N+1 in an ordered series of image representations, comprising:
- means for acquisition of an ordered series, in said (N+1)-th dimension, of image representations of dimension N,
- a memory for storing first and last respective initial segmentation masks in dimension N of a region of interest in the first and last image representations of the ordered series,
- a processor configured to:
  - estimate parameters of an overall upward registration of the first mask on the last mask of initial segmentation of the region of interest,
  - estimate parameters of an overall downward registration of the last mask on the first mask of initial segmentation of the region of interest,
  - upwardly automatically propagate the initial segmentation of the region of interest, from the first image representation, to all the other image representations of the ordered series by step-by-step registration up to the last image representation,
  - downwardly automatically propagate the initial segmentation of the region of interest, from the last image representation, to all the other image representations of the ordered series by step-by-step registration up to the first image representation, and
  - combine the upward and downward automatic propagations with one another, wherein the processor is further configured to combine the upward and downward automatic propagations with one another using a reference frame change, between the first and last image representations,
- by applying the estimated overall upward registration parameters to a result of the downward automatic propagation calculated for each image representation of the ordered series other than the first image representation and the last image representation, for a combination with a result of the upward automatic propagation also calculated for each image representation of the ordered series other than the first image representation and the last image representation, and
- by applying the estimated overall downward registration parameters to said result of the upward automatic propagation for a combination with said result of the upward automatic propagation.

* * * * *